July 21, 1953     D. A. DAVIS     2,645,858

AILERON GAUGE

Filed Dec. 12, 1949

Delbert A. Davis INVENTOR.

BY

Bush Bush

ATTORNEYS.

Patented July 21, 1953

2,645,858

UNITED STATES PATENT OFFICE 2,645,858

AILERON GAUGE

Delbert A. Davis, Centerville, Iowa, assignor of one-half to Harry N. Stamos, Centerville, Iowa Application December 12, 1949, Serial No. 132,520

16 Claims. (Cl. 33—174)

My invention relates to gauges to enable an airplane mechanic or owner to check the relative angles of ailerons and wings of an airplane and to readily adjust the ailerons at the angle specified by the manufacturer or determined to be the correct angle to procure the best results for any particular type of plane in common use.

It is well known that in order to avoid excessive vibration of the wings of many planes, and to avoid as much drag as possible, it is necessary to have the ailerons mounted upon the wings at a slight angle to the longitudinal axis of the wings. In other words, the ailerons are drooped or inclined slightly downwardly and rearwardly relatively to the wings.

Difficulty is experienced in adjusting the ailerons due to the fact that the planes are not always standing upon a level surface and may be tilted either laterally or to the front or rear.

In the past it has been common practice to use a surveyor's transit to gauge the ailerons and sometimes a spirit level or rule has been used to gauge them, but such operations are inconvenient, take a good deal of time and are not entirely accurate.

One of the objects of my invention is to provide a simple, economical tool or gauge of convenient size and light weight, which can be readily and quickly applied to the wings of an airplane and serve to accurately indicate their inclination and then applied to the ailerons to indicate the angle relatively to the wings to which the ailerons should be adjusted to meet the specification of the maufacturer or the requirements of any particular form of plane. Other objects will appear from the description.

I accomplish these objects by the means shown in the accompanying drawings, in which, Figure 1 is a side elevation of my gauge;

Similar numerals refer to similar parts throughout the several views.

Figure 2:
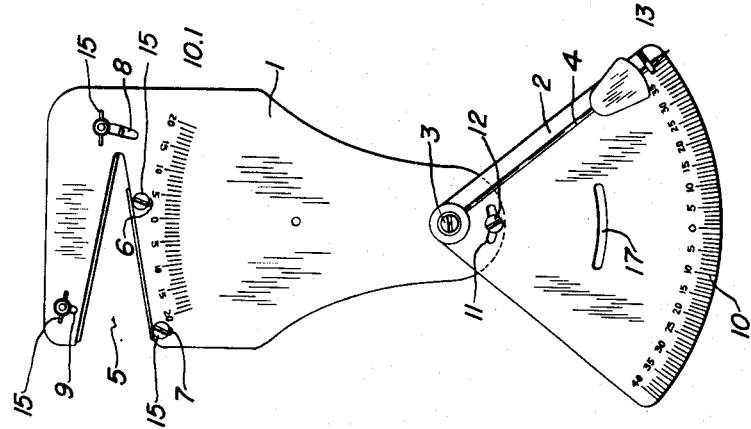
Figure 2 is a side elevation of my gauge as applicable to a wing of a different type.
Figure 3:
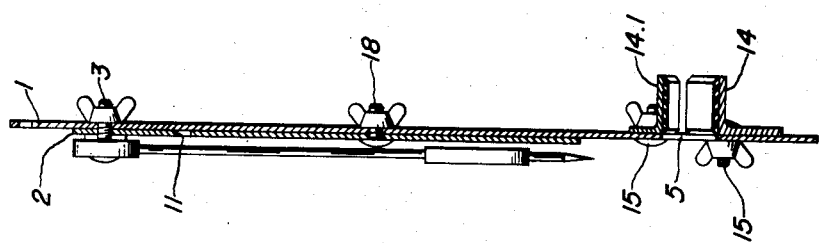
Figure 3 is a sectional elevation on the line 3—3 of Figure 2 but with the pendulum in full lines.
Figure 1:
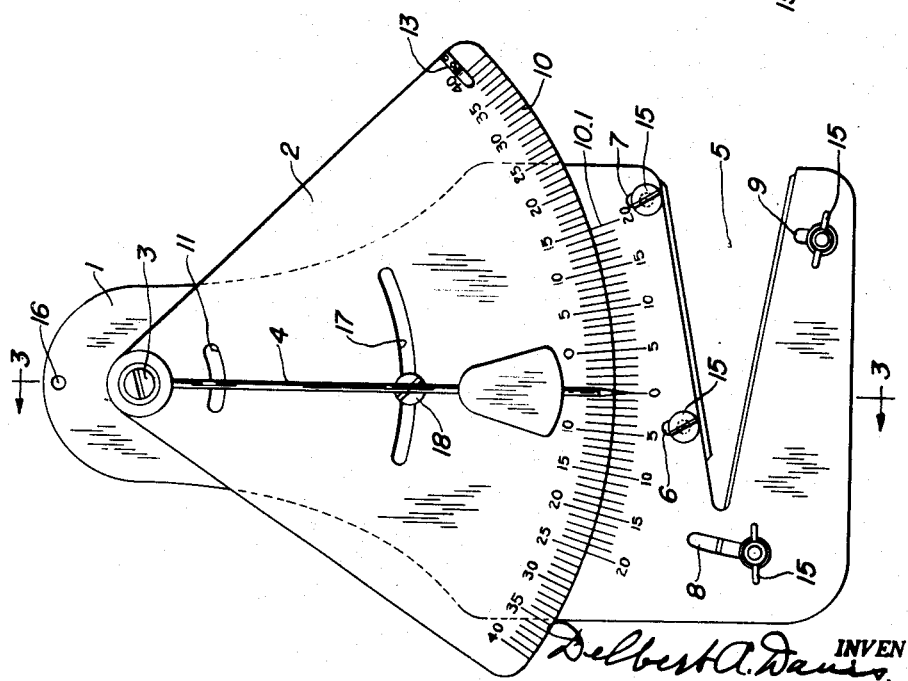

My apparatus may be made of aluminum, stainless steel, plastic or other suitable material. It comprises a thin back plate 1 having a V-shaped slot or opening 5 extending transversely thereof near one end with angle bars 14—14.1 mounted upon the back plate adjacent the lower and upper edges of the V-shaped slot and with longitudinal slots 6, 7, 8, 9 formed in the back plate 1 and with thumb screws or wing bolts 15 by which the angle bars may be fixed in various adjusted positions as necessary to make the faces thereof conform to the upper and lower faces of the wing or to the upper and lower faces of the aileron at the rear or trailing edge thereof. The angle bars are preferably faced with felt or other suitable material to avoid marring wings or ailerons.

Near the opposite end or top of the back plate 1 a bore is formed in which a pivot bolt 3 is seated which carries the upper end of a fan-shaped scale plate 2 which is free to swing upon said pivot. A slot 11 is formed in the fan plate upon an arc produced from the center of the pivot 3 and a bolt is mounted in a corresponding bore in the back plate by which the fan plate may be locked in adjusted position.

A scale 10 is marked upon the lower end of the fan plate witht the zero point at the middle of the lower edge of the fan plate.

A pendulum 4 is pivotally mounted upon the pivot 3 in front of the fan plate with a pointer extending down to the scale and freely movable along the scale as the back plate is inclined. I prefer to mount the pendulum upon a ball-bearing to insure free movement thereof.

A spring clip 13 is mounted upon one edge of the fan plate 2 in position to engage the rod of the pendulum and hold it against swinging when desired.

The form just described is intended to be applied to an airplane so constructed and positioned that the back plate may extend upwardly from the aileron or wing and be readily read by the operator.

In cases where it is more convenient to have the scale plate extend below the aileron or wing, the slotted end of the back plate may be reversed so as to extend downwardly from the wing or aileron. In such cases an additional bore 16 is formed in the opposite end of the back plate 1 in which a bolt or setscrew 12 can be inserted in order to lock the fan or scale plate along the slot 11 in desired position relative to the back plate. After being so locked, the back plate can be applied to the aileron and the position of the aileron adjusted so that the pendulum will swing to the proper distance from the zero point of the scale to give the desired inclination of the aileron to the wing.

The adjustment of the ailerons is accomplished by locking the control column of the plane in its central position and then by use of the turnbuckle or other adjusting means on the aileron rods or cables taking up or extending the rods or cables of the ailerons respectively until they reach the desired angle.

The back plate and other parts may be conveniently made from thin aluminum plates or thin plates of stainless steel or of any suitable plastic or other suitable material.

In the use of this gauge, the airplane is grounded upon a runway or other landing place and preferably upon a surface as near level as it is convenient to use, but it is not necessary that the surface should be level.

The back plate is then applied to the trailing edge of one of the wings with the angular slot astride the rear edge of the wing.

The wing bolts 15 of the angle bars are then loosened and the angle bars moved into contact with the upper and lower faces of the trailing edge of a wing. The wing bolts 15 are then tightened and the angle bars locked in position with the back plate extending vertically above the wing. The pendulum 4 is then released from the clip 13 and allowed to swing until it comes to rest in a vertical position. The fan-plate is then locked in that position and the back plate is then applied to the rear or trailing edge of the aileron. The adjusting rods or cables connecting the aileron to the control column or joy stick are then adjusted by use of the turnbuckles thereon or otherwise until the back plate has been inclined to a point where the pendulum will aline with the point on the scale indicating the relative degrees of droop or slant between the aileron and the wing which the manufacturer has specified or which has been found necessary for use on that type of plane in order to limit or avoid vibration and drag. The other aileron is then adjusted in the same way, it being understood that the cable connections of the respective ailerons to the control column or joy stick are separate and can be independently adjusted. It is to be understood that all adjustments made on aircraft are to be made according to the specifications of the manufacturer and C. A. A.

As the aileron may be constructed with its size and angles corresponding to the adjacent trailing edge or edges of the wing, it is obvious that the same result can be obtained by first positioning the aileron in exact line with the adjacent trailing edge of the wing and then applying my gauge to the aileron itself and locking the fan plate in the proper position to indicate the angle of the aileron from the horizontal. The aileron may then be moved as described to reach the angle prescribed by the manufacturer, which can be determined by the movement of the pendulum or pointer relatively to the fan plate.

If desired, my gauge can be used without the fan-plate and in such case a scale 10.1 would be plainly marked upon the back plate itself and when so used, it would only be necessary for the operator to remember the point upon the scale indicated by the pointer of the pendulum when the gauge was applied to a wing and then upon applying it to an aileron, to adjust the aileron until the pointer stood at the desired number of degrees from the point indicated by the pendulum when previously applied to the wing.

This gauge can also be used in checking the full swing of the ailerons and elevations.

By median angle as used in the claims, I refer to the relative angle of a plane projected through an aileron or wing half way between the top and bottom plates thereof, and the term "median plane" as a plane so projected.

Various modifications of the material, form and proportions of the parts of my device may be made and it may be applied to other uses without departing from the spirit of my invention, and I do not limit my claims to the precise forms shown in the drawing.

I claim:

1. An aileron gauge for airplanes including a vertical back plate with a transverse V-shaped angular opening near the lower end of the plate with edges corresponding to the angles of the top and bottom plates at the rear or trailing edge of an airplane aileron or wing whereby said edges may closely embrace the plates at the trailing edge thereof, a scale carried by the face of the back plate near the lower edge thereof, a pendulum-pointer pivotally mounted upon and near the upper end of the back plate and swingable along the scale in either direction, a fan-shaped scale plate mounted upon the pivot of the pendulum and free to swing thereon parallel to the back plate, a scale formed upon the face of the lower part of the fan plate parallel to the scale upon the back plate, an arcuate slot formed in the fan plate, a bore in the back plate adjacent to said slot and a thumb screw mounted in said slot and bore whereby the fan plate and back plate may be locked in various relative positions.

2. An aileron gauge as described in claim 1, and bars mounted upon the back plate adjacent the edges of the transverse opening and adjustable so as to contact the upper and lower faces of a wing or aileron.

3. An aileron gauge as described in claim 1, and padded angle bars adjustably mounted upon the back plate adjacent the edges of the transverse opening and arranged to be fitted closely to the upper and lower faces of a wing or of an aileron of an airplane.

4. An aileron gauge for airplanes including a vertical back scale plate with a transverse angular opening near the lower end thereof having edges corresponding to the angles of the upper and lower plates at the rear or trailing edge of an airplane wing or aileron and adapted to embrace closely the trailing edge of either a wing or aileron of an airplane, a pendulum with a pivot-like pointer pivotally mounted upon the upper end of the back plate and arranged to swing along a scale carried by the face of the back plate above the V-shaped opening, a front scale plate pivotally mounted upon the pivot of the pendulum between the pendulum and the back plate and having an arcuate scale marked thereon to indicate degrees of inclination, and means to lock the scale plates together in various positions of adjustment whereby the angle of an aileron or wing measured thereby may be indicated by locking the front scale plate to the back scale plate in the position which the front plate automatically assumes when swinging freely upon its pivot along the back plate scale with the back plate applied to the trailing edge of a wing or aileron.

5. In a gauge for airplane ailerons, the combination with a vertical back plate carrying a scale on the front thereof, of a front scale plate parallel thereto and pivotally mounted upon the back plate and carrying an arcuate scale indicating degrees of angle upon the face thereof, a pendulum-pointer mounted upon the pivot of the front scale plate and swingable along the scales of both plates, a transverse V-shaped angular opening formed in the lower part of the back plate adapted to engage the upper and lower plates at the trailing edge of an aileron or wing of an airplane, bars adjustably mounted upon the back plate adjacent the edges of the angular opening, means to adjust the bars to vary the opening to correspond to the position of the upper and lower faces of an aileron or wing and fit closely thereto, means to lock the scale plates together in various relative positions of their respective scales whereby the angle of an aileron or wing may be indicated by locking the front scale plate to the back plate in the position which the front plate automatically assumes when free to swing upon the back plate with the V-opening of the back plate applied to the trailing edge of a wing or aileron.

6. An airplane gauge as described in claim 5, the means to lock the scale plates including an arcuate slot in the front scale plate, a threaded bore in the back plate spaced from the pivot and a bolt mounted in said slot and bore whereby the front scale plate may be secured in various adjusted positions relative to the back plate.

7. In an aileron gauge for airplanes, the combination with a vertical support having a transverse V-shaped opening in the support, of a scale plate pivotally mounted upon the support with its pivot carrying a pointer having its lower end arranged to travel along the scale as the support is inclined laterally in either direction, and bars adjustably mounted upon the support adjacent and along the sides of the V-shaped openings whereby the support may be closely fitted to an aileron or wing.

8. A gauge as described in claim 7, with an arcuate slot in the scale-plate and an adjustable bolt passing through the scale-plate and the support whereby the scale-plate may be secured in fixed position relative to the support.

9. A gauge for airplane wings and ailerons as described in claim 4, and means to lock the pivoted scale plate to the back plate in various adjusted positions.

10. A gauge for airplanes as described in claim 9, the pivoted plate being arranged to swing through an angle of 180° whereby the back plate may be applied to a wing or aileron to extend upwardly therefrom or to depend therefrom as most convenient.

11. A gauge for airplanes as described in claim 9, the pivoted scale plate and pointer-pendulum being arranged to swing through an angle of 180° whereby the back plate may be applied to a wing or aileron to extend upwardly therefrom or to depend therefrom as most convenient.

12. A gauge for airplanes as described in claim 9, the pivoted scale plate and pointer-pendulum being arranged to swing through an angle of 180° in either direction whereby the back plate may be applied to a wing or aileron to extend upwardly therefrom or to depend therefrom as most convenient.

13. An airplane gauge as described in claim 10 and a resilient clip united to one edge of the scale plate arranged to receive and detain the pointer-pendulum.

14. An aileron gauge for airplanes including a flat vertical back plate with a transverse V-shaped angular opening near one end of the plate with edges similar to the angles of the rear or trailing portion of an airplane wing or aileron and adapted to embrace the trailing edge of either the wing or aileron of an airplane, a pendulum-pointer pivotally mounted upon the other end of the back plate and arranged to swing along the back plate, a fan-shaped plate pivotally mounted upon the pivot of the pendulum between the pendulum and the back plate having an arcuate scale marked thereon to indicate degrees of inclination, and an arcuate slot formed in the scale plate to receive a winged bolt removably mounted in a suitable bore in the back plate whereby the scale plate and back plate may be rigidly united and the median angle of the aileron or wing may be accurately determined for comparison with the median angle of the opposite aileron or wing when the gauge is thereafter applied to the other aileron or wing of a given plane for determination of the respective angles thereof whereby the ailerons or wings may be adjusted so as to secure uniformity thereof.

15. A gauge for airplanes as described in claim 14, the pivoted scale plate and pointer-pendulum being arranged to swing through an angle of 180° in either direction.

16. An aileron gauge for airplanes including a flat vertical back plate with a transverse V-shaped angular opening near one end of the plate with edges similar to the angles of the rear or trailing portion of an airplane wing or aileron and adapted to embrace the trailing edge of either the wing or aileron of an airplane, a pendulum-pointer pivotally mounted upon the other end of the back plate and arranged to swing along the back plate, a fan-shaped plate pivotally mounted upon the pivot of the pendulum between the pendulum and the back plate having an arcuate scale marked thereon to indicate degrees of inclination, and co-acting means provided in the scale plate and back plate to lock them in adjusted relative position.

DELBERT A. DAVIS.

References Cited in the file of this patent

UNITED STATES PATENTS

| Number | Name | Date |
|---|---|---|
| 129,349 | Kellog | July 16, 1872 |
| 636,843 | Ramsey | Nov. 14, 1899 |
| 751,763 | Wagor | Feb. 9, 1906 |
| 922,960 | Schatz | May 25, 1909 |
| 1,439,276 | Teeter | Dec. 19, 1922 |
| 1,707,593 | Arbuckle | Apr. 2, 1929 |
| 1,962,045 | Walton | June 5, 1934 |
| 2,170,824 | Lichtenwalner | Aug. 29, 1939 |
| 2,348,095 | Roby | May 2, 1944 |
| 2,449,870 | Austen | June 5, 1948 |

FOREIGN PATENTS

| Number | Country | Date |
|---|---|---|
| 392,091 | Germany | Mar. 15, 1924 |
| 455,963 | Germany | Feb. 13, 1928 |